Nov. 18, 1952     G. R. CARLSON     2,618,043
MACHINE TOOL
Filed Feb. 14, 1947     3 Sheets-Sheet 1
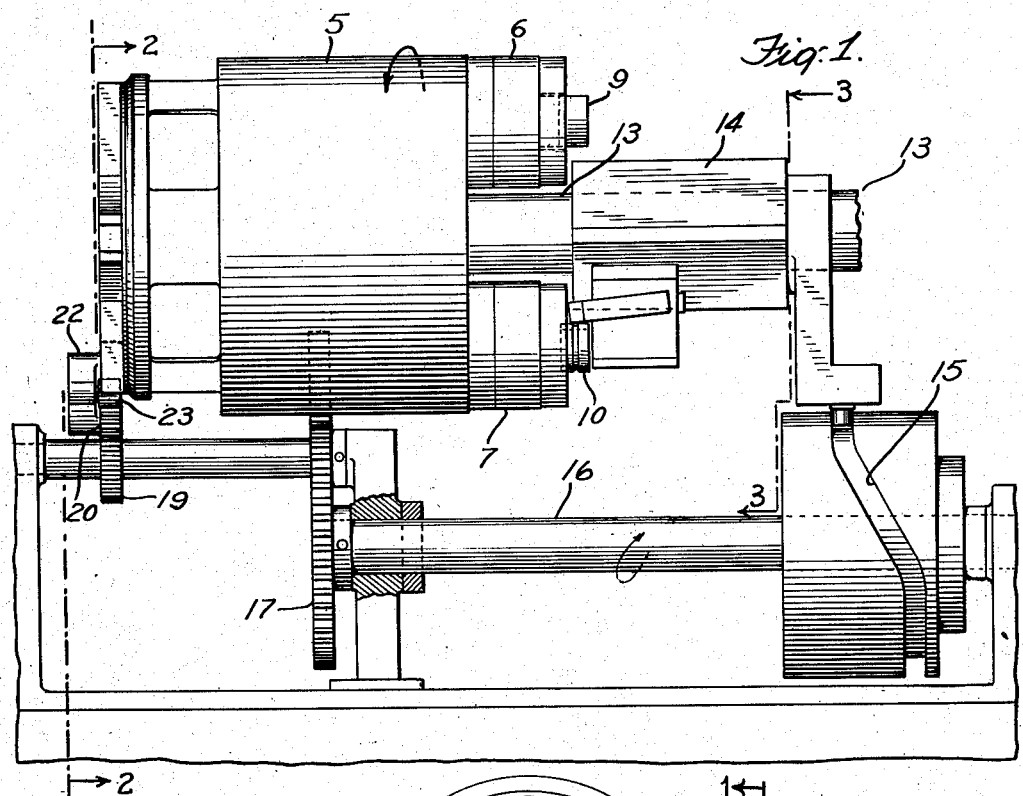
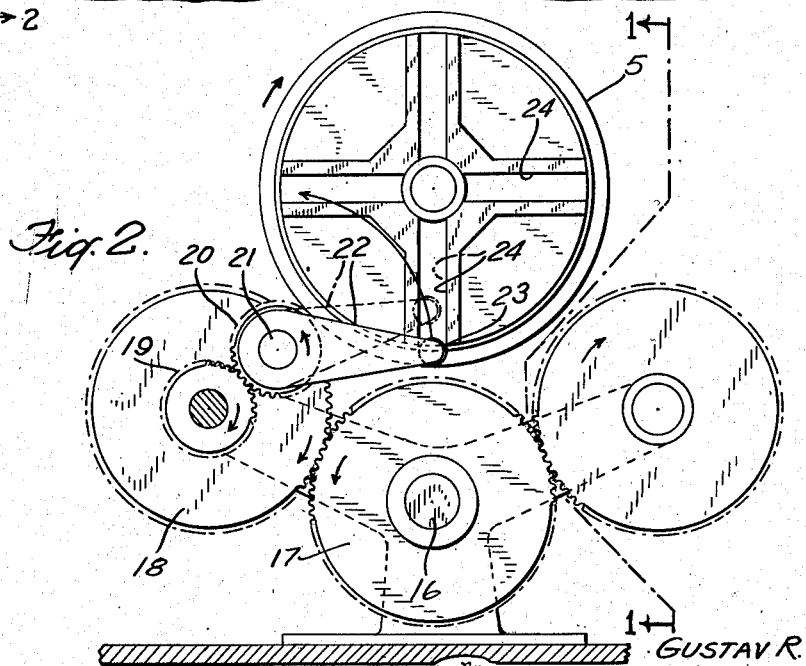
Inventor
GUSTAV R. CARLSON
Attorneys.

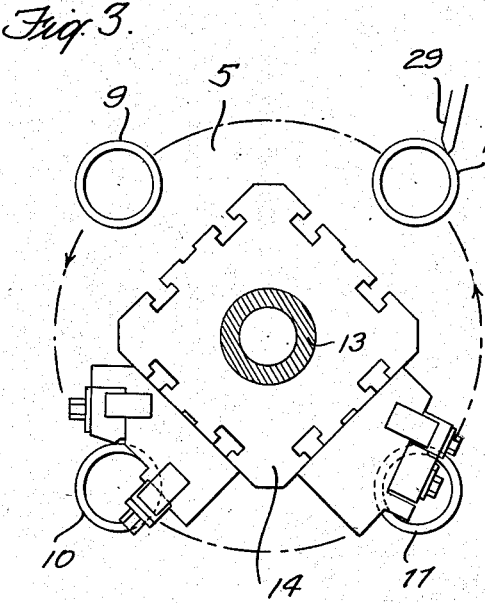
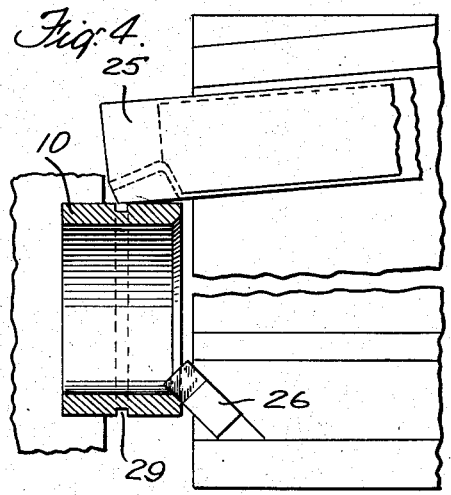
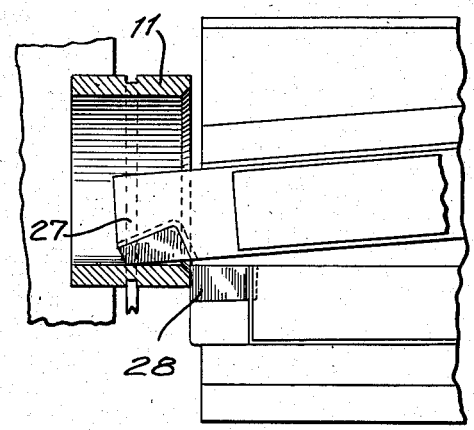
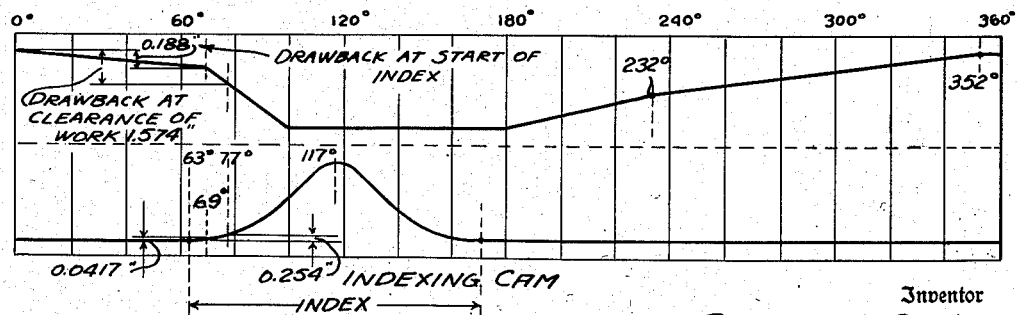

Nov. 18, 1952     G. R. CARLSON     2,618,043
MACHINE TOOL
Filed Feb. 14, 1947     3 Sheets-Sheet 3
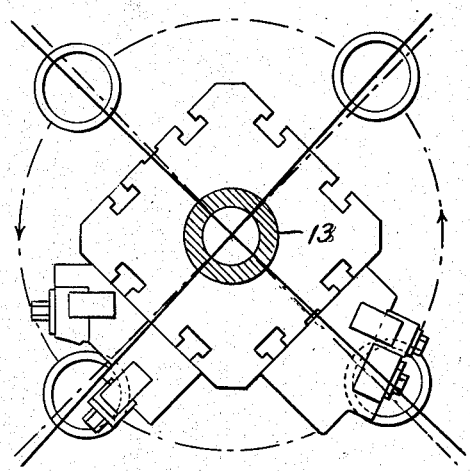
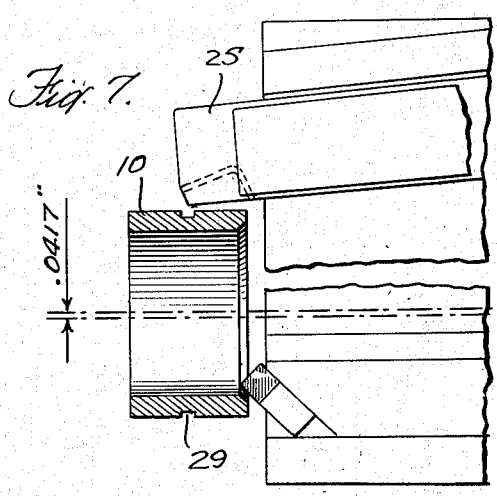
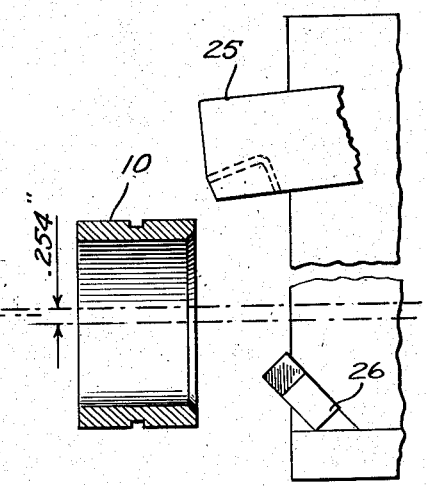
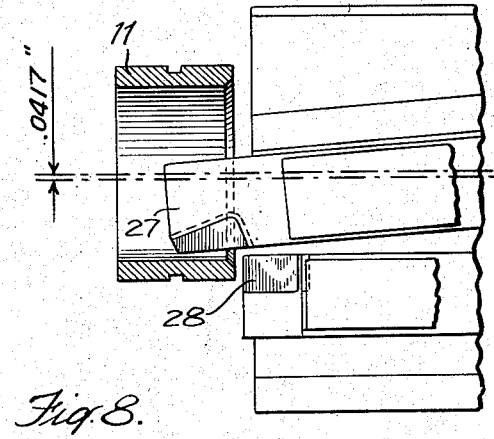
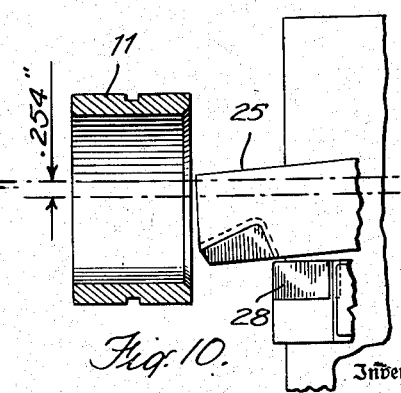
Inventor
GUSTAV R. CARLSON Patented Nov. 18, 1952

2,618,043

UNITED STATES PATENT OFFICE 2,618,043

MACHINE TOOL

Gustav R. Carlson, New Britain, Conn., assignor to The New Britain Machine Company, New Britain, Conn., a corporation of Connecticut Application February 14, 1947, Serial No. 728,502

2 Claims. (Cl. 29—37)

My invention relates to an indexing type of machine tool.

It is well known that, upon the withdrawal of a tool axially of a work-piece after an operation such as a turning or boring operation, the tool leaves a so-called drag-off mark, which is often detrimental in subsequent finishing operations, and is generally unsightly if there are no further finishing operations.

It is the general object of my invention to provide a novel method or means for obviating the drag-off mark caused by separation axially of the work and a tool after an operation such as a turning or boring operation.

It is another object to provide a method or means for avoiding tool wear incident to certain operations of a machine tool.

In a machine tool of the indexing type, the work and the tool are indexed relatively to each other to bring a new tool to operate on the work-piece or a new work-piece to be operated upon by the same tool. As has been indicated above, when a tool and work-piece are withdrawn relatively to each other in a direction axially of the work (after an operation such as a turning or boring operation has been performed), the tool will leave a drag-off mark on the work-piece. In order to prevent the formation of a drag-off mark, my invention contemplates a method or means for slightly indexing the tool and work-piece relatively to each other in a direction to free the finished surface of the work-piece and the tool from each other, after which the tool and work-piece are withdrawn relatively to each other so that the complete indexing operation may be performed.

Indexing-type machines of the character indicated may be of several kinds; for example, the tools may be carried on an indexing head or turret so that the tools may operate seriatim on a work-piece or work-pieces, which are rotating. Again, the tools may be arranged so that they are not indexed, but the work-pieces are indexed so that the work-pieces are brought into position to be operated on seriatim by the tool or tools.

The invention will be described herein as embodied in a multiple-spindle chucking or screw machine in which a plurality of work-pieces are carried by rotatable spindles in an indexing spindle carrier, and one or more tools are arranged for movement axially of the work-pieces; the tool and work-pieces may thus be fed and withdrawn relatively to each other in a direction axially of the spindle carrier, in the performance of such operations as turning or boring. It will be understood that the invention may be embodied in other types of machines, for example, such as the other types heretofore mentioned.

In the machine to be described, means are provided for feeding a tool, such as a boring or turning tool in a direction axially of the work-piece, so as to perform a boring or turning operation. After the completion of the operation, the spindle carrier is indexed slightly so as to just free the finished surface on the work-piece from the tool. The tool is then withdrawn axially so as completely to free the tool from the work and permit the complete indexing of the spindle carrier. Upon indexing, a new work-piece is brought into position to be operated upon by the same tool. Thus, since the tool and work-piece are free from each other before the tool is axially withdrawn to any extent, the tool will leave no drag-off mark on the finished surface of the work-piece.

There is a further advantage of my invention, particularly when carbide-tipped tools are employed. It is known that with carbide-tipped tools, either relatively heavy feeds must be employed or tool wear will be excessive. Since a drag-off mark is, in effect, the result of a very light feed, drag-off marks tend to wear a carbide-tipped tool unduly. Therefore, avoidance of the drag-off mark tends to avoid, or at least materially to reduce, wear of a carbide-tipped tool.

In the drawings which show, for illustrative purposes only, a preferred form of the invention—

Fig. 1 is a side view of certain elements of an automatic screw machine or chucking machine embodying the invention;

Fig. 2 is an end view taken substantially in the plane of the line 2—2 of Fig. 1, illustrating the indexing mechanism and its relation to the main cam shaft;

Fig. 3 is a fragmentary, sectional view looking in the direction of the spindles and taken substantially in the plane of the line 3—3 of Fig. 1;

Fig. 4 is an enlarged sectional view through a work-piece showing a turning tool and a chamfering tool at the positions they occupy at the end of the feed movement;

Fig. 5 is a similar view showing a boring tool and a facing tool at the completion of boring and facing operations;

Fig. 6 is a view similar to Fig. 3, except that the spindle carrier has been slightly indexed so as to free the work and the tools;

Fig. 7 is a view like Fig. 4, except that the work has been slightly indexed and the tools freed from the surfaces that have just been finished, the tools being slightly axially withdrawn;

Fig. 8 is a view like Fig. 5, but showing the boring tool separated from the work when the work has been slightly indexed, the tools again being slightly axially withdrawn;

Fig. 9 is a view like Fig. 7, but showing the tools completely withdrawn from the work so as to permit the complete indexing movement of the work;

Fig. 10 is a view like Fig. 8, but showing the boring tool completely withdrawn so as to permit complete indexing; and Fig. 11 is a timing chart showing the timing relation between indexing and the feeding mechanism.

The parts of the machine illustrated are of an automatic chucking or screw machine, more or less like the machine illustrated in Gridley et al. Patent No. 2,055,435, September 22, 1936, to which patent reference is made for a fuller disclosure of the machine as a whole. The machine includes an indexible spindle carrier 5, held in suitable frame supports (not shown). The spindle carrier has a plurality (in this case four) of spindles such as 6—7, located in the drawings, respectively, in the first, second, third, and fourth positions. The spindles carry chucks for holding work-pieces 9, 10, and 11, in the first, second, and third positions, and a work-piece 12 in the fourth position, which is the cut-off position. The work-piece 9 is indicated in Fig. 3 in the first or loading or feed-out position.

The spindle carrier carries a stem 13 on which the Gridley-type tool slide 14 is slidably mounted and guided. The tool slide 14 is moved in feeding and withdrawing (or drawback) directions by cam surfaces on the cam drum 15 on the main cam shaft 16, as will be understood. The spindle carrier is indexed by or in timed relation with the main cam shaft 16. As shown best in Figs. 1 and 2, the main cam shaft 16 carries a gear 17, driving a gear 18. The gears 17—18 are of the same size. On the shaft of the gear 18 there is a pinion 19 meshing with a pinion 20 of the same size, and the latter pinion drives the shaft 21 of the index arm 22. The index arm carries an index roll 23 for travel in the slots 24 of a Geneva wheel, fixedly carried by the spindle carrier 5. Thus, upon rotation of the main cam shaft 16 in the direction indicated by the arrow, the index arm 22 will be rotated so as to index the spindle carrier one-fourth of a revolution, as will be understood. As is more fully set forth in the patent heretofore referred to, the spindle carrier is locked in each of its four indexed positions between indexing movements.

The tool slide 14, opposite the second position of the spindle carrier, carries a turning tool 25 and a chamfering tool 26 for turning and for chamfering the outside diameter of the work-piece in the second position; that is, the work-piece 10 as shown in the drawings. Opposite the third position, the tool slide 14 carries a boring tool 27 and a facing tool 28 for acting on the work-piece in the third spindle position, which, as illustrated in the drawings, is the work-piece 11. In the fourth position, a cut-off tool 29 severs the work-piece, and in the first position a new length is fed out or a new unfinished work-piece is placed in the chuck. At each indexing movement of the spindle carrier, each work-piece is advanced one position, and each work-piece is operated upon by every tool during the complete cycle.

As shown particularly in Figs. 1 and 2, the main-feed cam 15 is in such position that the tool slide 14 has completed its full forward (or feeding) movement, and all of the tools 25—26—27—28 (see Figs. 4 and 5) have completed their operations on the work-pieces 10—11. It will be understood that the cut-off tool 29 is operated in the usual fashion, which operation has nothing to do with the present invention. It will be seen, also, that, due to the timing relationship between the main cam 16 and the shaft 21 for the index arm 22, the index roll 23 has just entered or is about to enter the lower slot to begin the indexing movement of the spindle carrier 5. During this first indexing movement, say, until the index arm reaches the dot-dash position of Fig. 2, the main feed cam may hold the tools in full forward or substantially full forward position. The first small movement of the index arm, as indicated, will serve slightly to index the spindle carrier through a very small angle, as shown, between the full and dot-dash lines of Fig. 6. This small movement is sufficient to free the turning, boring, chamfering, and facing tools from the work-pieces. Thereafter, while the indexing movement of the spindle carrier continues, the draw-back surface on the main cam 15 rapidly withdraws the tools axially of the work-pieces; and, since the tools and work-pieces were freed of each other before the withdrawing movement, the tools cannot leave any drag-off marks on the surfaces which they have just finished. The timing of the index arm and the main feed cam 15 is such that the tools will be completely withdrawn axially from the work to, say, the positions shown in Figs. 9 and 10 before the spindle carrier will have indexed far enough to cause any interference between the work and the tools during indexing. When the tools have been completely withdrawn, the continued indexing movement of the spindle carrier completes the indexing, and after the spindle carrier is locked, the same tooling operations are repeated.

It will be seen that I have provided an exceedingly simple method and means for avoiding tool drag-off marks caused by the separation of tools and work in a direction axially of the work. By properly timing the indexing and the drawback movements and by properly positioning the tools, there will be no interference or injury to the parts, and yet the indexing and drawback movements may occur in part, at least, simultaneously and drag-off marks will be avoided.

It is advantageous to withdraw the tools to a very slight extent rather quickly at the end of their forward feed movement, so that the tools will not rub on the finished surfaces or shoulders formed at the end of the machining operations. Therefore, in a preferred form of the invention, I arrange the main feed cam 15 (or separate feed and drawback cams, if provided) so that very soon after the feed motion is completed the tools are slightly withdrawn axially, say, to the axial positions shown in Figs. 7 and 8; this slight axial withdrawal preferably occurs before or simultaneously with the first indexing movement of the spindle carrier. The slight withdrawal of the tools will be understood to obviate the idle running of the tools against shoulders formed in the work and thus to save such tool wear as is occasioned most noticeably on carbide-tipped tools. Of course, any slight axial withdrawal of the tools would form or would tend to form a drag-off mark of an extent commensurate with the extent of axial withdrawal of the tools. In the particular instance shown, such a drag-off mark would be of no moment, since it would occur only on the inside by the boring tool 27, because, in the instance shown, the work-pieces are broken down or necked (as at 29) by a break-down tool in, say, the second position, and any drag-off marks would disappear with the cut-off chip.

The diagram, Fig. 11, may be considered merely as a typical timing diagram between the feed works and the indexing means, and the characteristics of the tool-slide cam (upper portion of the diagram), at least, would vary widely, depending upon the character of work being done on the machine. As shown, indexing starts at the 63° line. By the time the 69° line is reached, the tools and work have been separated by a very small amount, say, 0.0417 inch, measured circumferentially of the spindle circle, as shown in Fig. 11. By the time the 77° line is reached, the tools will have been withdrawn to the positions shown in Figs. 9 and 10, but since the Geneva index motion accelerates very slowly (at the outset), the total indexing movement measured on the center line of the spindles would have amounted but to 0.254 inch, as shown in the diagram. Of course, with work of different sizes and lengths, the various distances and movements would be varied, and the characteristics of the drawback cam and of the indexing motion would be arranged so that the machine would operate as heretofore described.

I have used the term "tool" or "tools" in the claims to mean tools which can be freed of the work (by proper placing of the tools) by an indexing movement between the tools and the work. While the indexing of the spindle carrier is accomplished in the specific machine illustrated by a Geneva index device, it will be understood that any indexing movement of the tools and work relatively to each other will suffice, whether caused by a Geneva motion or not, as long as the movement tends to free the tools and work sufficiently to prevent drag-off marks.

I claim:
1. In a machine of the character indicated, a work holder, a tool holder, feed means for feeding said holders relatively to each other, indexing means with a relatively slow-start characteristic for indexing said work holder and said tool holder relatively to each other, said tool holder being positioned to hold a tool for operation on one side of work supported in said work holder, said one side being the side for which indexing out of an indexed position will produce a motion of the tool away from said one side of the work, and synchronized drive means for both said feed means and indexing means, both said drive means being timed to commence an indexing relative movement of said holders at the maximum-feed position of said holders.

2. A machine tool comprising an indexible spindle carrier, a plurality of spindles mounted thereon, means to index said carrier with a period of relatively slow indexing movement followed by a period of relatively rapid indexing movement, a tool holder and a tool carried thereby, means to feed said tool holder along a workpiece mounted in a spindle, the point of engagement of the tool with the workpiece permitting indexing of said carrier while said tool is in contact with said workpiece, and driving means for said indexing means and said feeding means arranged to start the operation of the indexing means when the tool is in its maximum feed position.

GUSTAV R. CARLSON.

REFERENCES CITED

The following references are of record in the file of this patent:

UNITED STATES PATENTS

| Number | Name | Date |
| --- | --- | --- |
| 1,721,671 | Schlitters | July 23, 1929 |
| 1,794,390 | Trobeck | Mar. 3, 1931 |
| 1,895,078 | Lewis | Jan. 24, 1933 |
| 2,055,435 | Gridley et al. | Sept. 22, 1936 |
| 2,056,835 | Drissner | Oct. 6, 1936 |
| 2,232,660 | Guild | Feb. 18, 1941 |
| 2,399,621 | Bodmer | May 7, 1946 |